(12) United States Patent
Townsend

(10) Patent No.: US 6,955,830 B2
(45) Date of Patent: Oct. 18, 2005

(54) METHOD FOR INJECTING FLUID INTO MEAT PRODUCTS

(75) Inventor: Ray T. Townsend, Des Moines, IA (US)

(73) Assignee: Townsend Engineering Company, Des Moines, IA (US)

(*) Notice: Subject to any disclaimer, the term of this patent is extended or adjusted under 35 U.S.C. 154(b) by 380 days.

(21) Appl. No.: 10/309,491

(22) Filed: Dec. 4, 2002

(65) Prior Publication Data

US 2004/0109923 A1 Jun. 10, 2004

(51) Int. Cl.⁷ ................................................. A23L 1/318
(52) U.S. Cl. ........................................ 426/281; 99/533
(58) Field of Search ............................. 426/281; 99/533

(56) References Cited

U.S. PATENT DOCUMENTS

| | | |
|---|---|---|
| 644,248 A | 2/1900 | Huntington |
| 2,980,537 A | 4/1961 | Hagen et al. |
| 4,258,067 A | 3/1981 | Stoll et al. |
| 4,680,832 A | 7/1987 | Langen |
| 4,953,456 A | 9/1990 | Prosenbauder |
| 4,992,287 A * | 2/1991 | Dreano ........................ 426/418 |
| 5,904,715 A | 5/1999 | Jeter et al. |
| 5,934,187 A | 8/1999 | Leon |

FOREIGN PATENT DOCUMENTS

DE          3117899      *  3/1982

* cited by examiner

Primary Examiner—Arthur L. Corbin

(57) ABSTRACT

A method for injecting fluid into meat products comprises taking a plurality of hollow fluid injection needles having sharpened discharge ends, and connecting the needles to a source of pressurized liquid; penetrating the sharpened ends of the needles into the product and thence withdrawing the same while discharging fluid into the product and vibrating the needles for a period of time while they are within the product to enlarge the size of a penetration hole within the product caused by the penetration of the needles to a size greater than the size of the needles to create at least a partial space around the needles to permit fluid from the needles to migrate into the spaces around the needles. The needles have a roughened outside surface.

5 Claims, 3 Drawing Sheets

METHOD FOR INJECTING FLUID INTO MEAT PRODUCTS

BACKGROUND OF THE INVENTION

It is common to inject brine or similar fluids into meat products for purposes of preservation and flavoring. Many machines have been devised which have a battery of reciprocal needles which are adapted to penetrate meat products and are adapted to inject fluid into the meat products through the needles. However, at times, the injected fluid does not pass into the meat in a uniform manner.

It is therefore a principal object of this invention to provide a meat injection machine that will enhance and facilitate the uniform migration of fluid as injected into a meat product.

A further object of this invention is to provide a meat injection machine that will vibrate the needles which penetrates the meat product to create an enlarged penetration hole wherein the fluid can surround the needle to facilitate its migration into the product.

These and other objects will be apparent to those skilled in the art.

SUMMARY OF THE INVENTION

A method for injecting fluid into meat products comprises taking a plurality of hollow fluid injection needles having sharpened discharge ends, and connecting the needles to a source of pressurized liquid; penetrating the sharpened ends of the needles into the product and thence withdrawing the same while discharging fluid into the product and vibrating the needles for a period of time while they are within the product to enlarge the size of a penetration hole within the product caused by the penetration of the needles to a size greater than the size of the needles to create at least a partial space around the needles to permit fluid from the needles to migrate into the spaces around the needles to facilitate the dispersion of the fluid into the meat product. The vibration continues at least as long as the needles are in the meat. The needles have a roughened outside surface to facilitate the creation of the enlarged size of the penetration hole.

An apparatus for injecting fluid into meat products comprises a frame, an injection head having a plurality of downwardly extending hollow fluid injection needles having sharpened lower fluid discharge ends to penetrate a meat product for injecting fluid therein, with a source of pressurized fluid connected to the needles, the invention comprising, a vibrating mechanism on the machine operatively connected to the needles to cause the needles to vibrate as they penetrate a meat product to create at least a partial space around the needles to permit fluid from the needles to migrate into the spaces around the needles to facilitate the dispersion of the fluid into the meat product.

DESCRIPTION OF THE DRAWINGS AND PREFERRED EMBODIMENT

The terms "meat" or "meat products" used herein shall pertain to meat, fish, and poultry products as well as any other food stuff that is subject to being injected by the means of needles penetrating the product in question.

Figure 1:
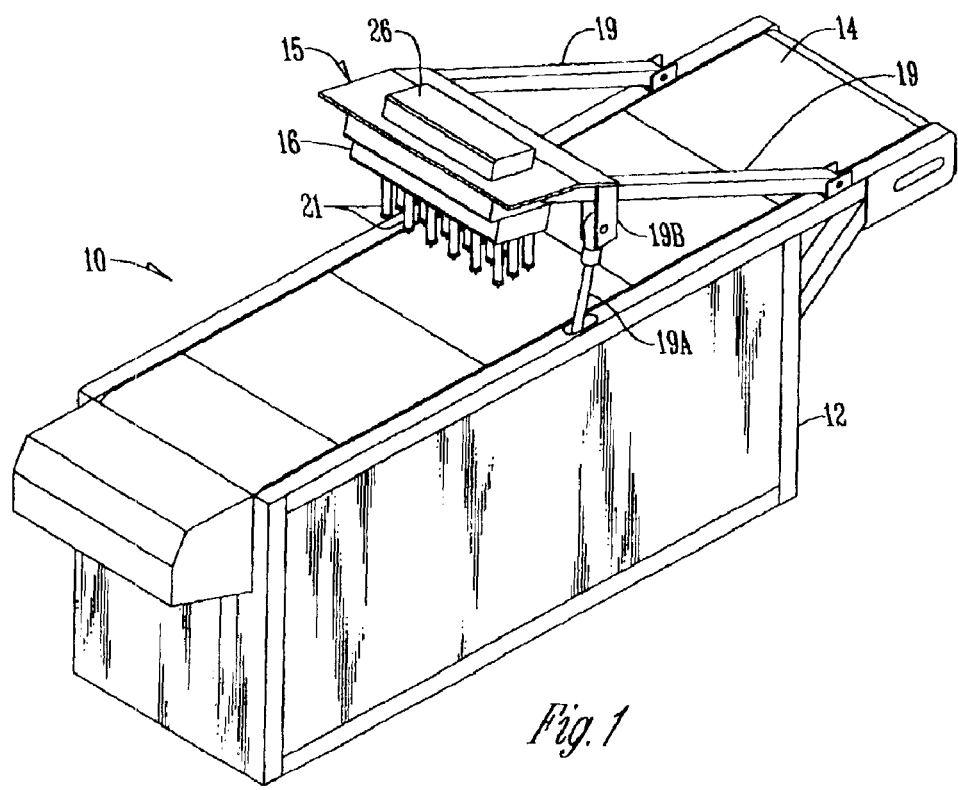
Figure 2:
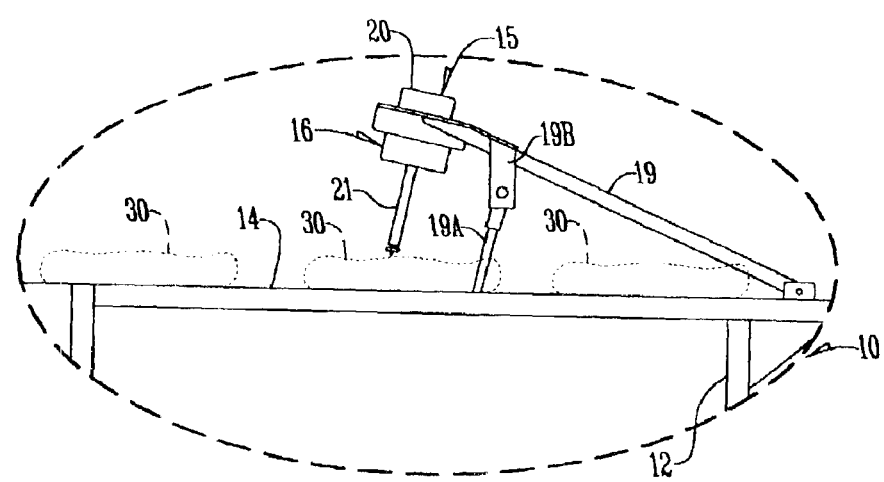
Figure 3:
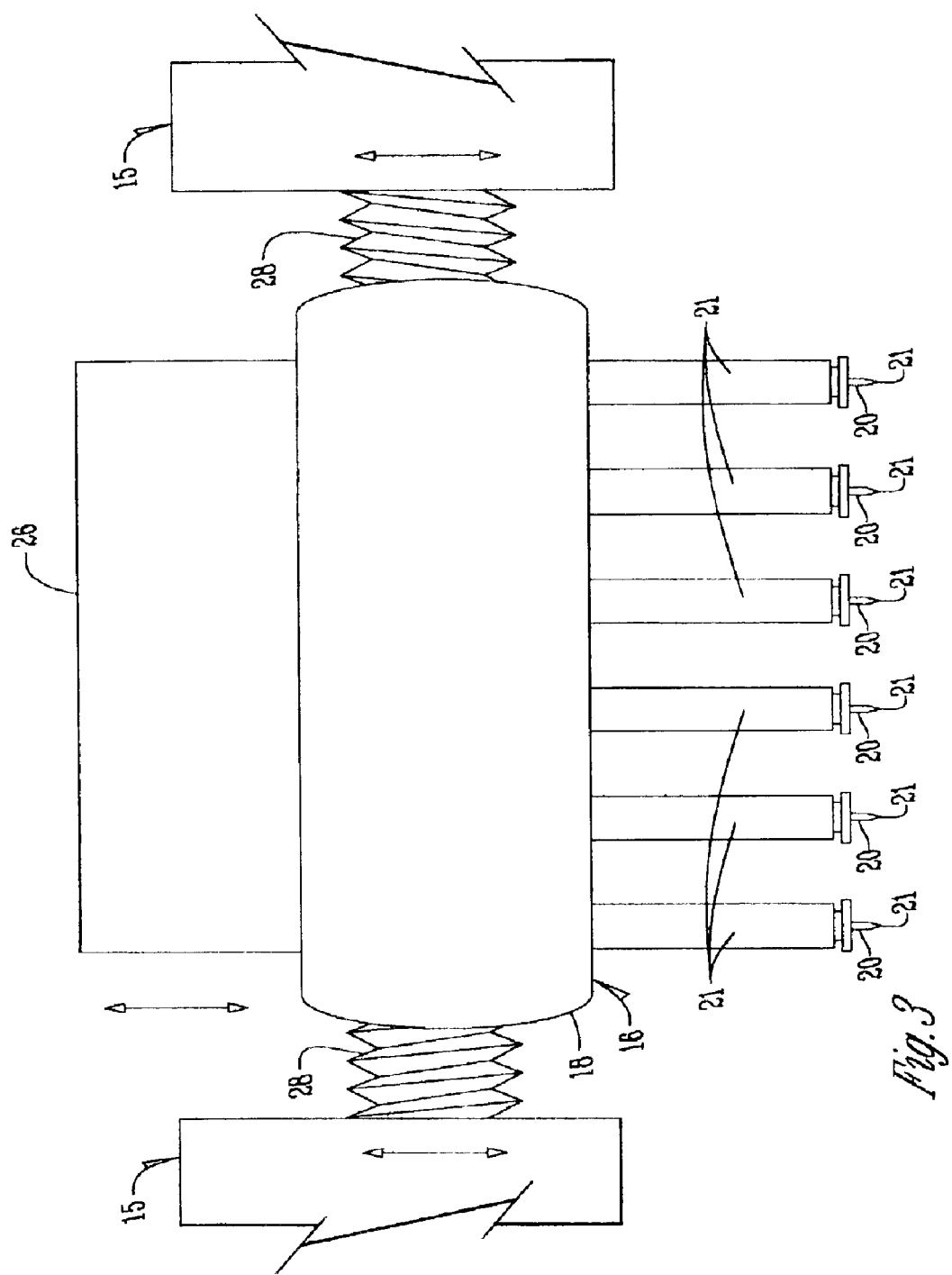

With reference to FIG. 1, a meat injection machine 10 has a frame 12 and a conventional horizontal continuous conveyor 14. An injection assembly 15 is positioned over the conveyor and includes a needle head 16 comprised of a plurality of needles as will be described hereafter. The needle head includes fluid reservoir 18 which includes a conventional pump or the like to provide pressurized fluid, such as salt brine, to the needles. The injection assembly 15 is supported on a pair of pivotal arms 19 which are pivotally connected at one end to the frame and are connected to the other end to the injection assembly. The upper ends of the arms 19 are pivoted about the lower ends thereof by pneumatic cylinders or the like 19A coupled to the upper ends of the arms by brackets 19B.

The numeral 20 designates the injection needles which are conventionally hollow so as to pass fluid therethrough. The needles are slidably mounted within the needle cylinders 21, and the fluid conventionally used in the injection assembly is forcible moved through the lower discharge ends 22 of the needles. The outer surface of the needles 24 is of a roughened texture to tear or otherwise generate a larger penetrating hole in the meat product as will be discussed hereafter.

A conventional vibrating mechanism 26 used in other environments is attached to the injection assembly 15 in any convenient way. Resilient support elements 28 extend from the vibrating mechanism 26 and are connected to the needle head 16 so as to be able to impart vibration motion to the needles. The vibrating mechanism is preferably generated by electromagnets. A conventional electro-permanent magnetic drive vibrator suitable for use in this invention is the Eriez Model 20N Bin Vibrator available through Industrial Motion Technologies, Inc. of Erie, Pa.

Figure 4:
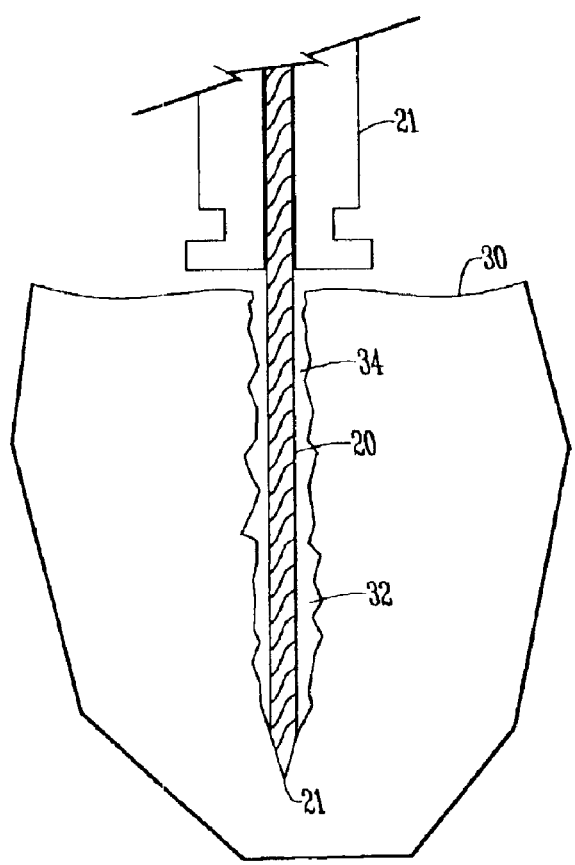
Figure 5:
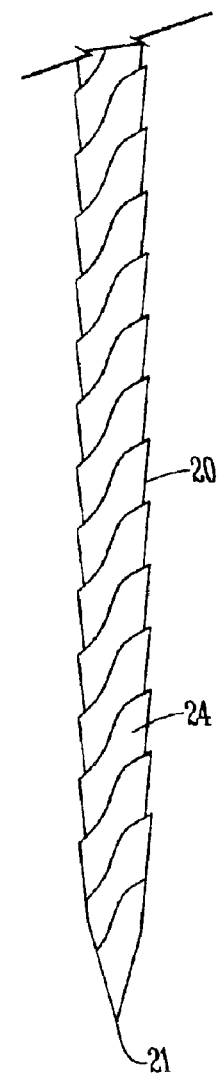

A plurality of meat products 30, such as bacon slabs, are moved sequentially underneath the needle head 16. When a given slab of meat 30 is beneath the needle head, the arms 19 are actuated in conventional fashion (see for example, U.S. Pat. No. 5,638,744) to cause the needles to move downwardly towards the meat product 30. When the downward action of the needle head 15 engages the meat (see FIG. 4) the needle 20 extends out of the needle cylinder 21 and penetrates the meat. Because of the rough texture 24 on the outer surface of the needle and because of the lateral vibration imposed on the needle by the vibrating mechanism 26, an irregular penetrating hole 32 is created in the meat product (FIG. 4). The irregular penetrating hole is larger in size, and particularly larger in diameter, than the needles 20 so as to create a space 34 around the needles.

As the fluid is discharged from the lower end 21 of the needles, the fluid tends to flow upwardly into the space 32 around the outer surface 24 of the needle 20. The space 34 filled with fluid facilitates the uniform migration of the fluid throughout the thickness of the meat product. This action greatly facilitates the uniform distribution of fluid into the meat product.

It is therefore seen that this invention will achieve at least all of its stated objectives.

What is claimed is:

1. A method of injecting fluid into a meat product comprising,
   connecting a plurality of hollow fluid injection needles, having sharpened discharge ends, to a source of pressurized liquid;

penetrating the sharpened ends of the needles into the meat product;

vibrating the needles for a period of time while they are within the meat product to enlarge the size of each penetration hole within the meat product, caused by the penetration of the needles, to a size greater than the size of the needles to create at least a partial space around the needles to permit fluid from the needles to migrate into the spaces around the needles to facilitate the dispersion of the fluid into the meat product; and then withdrawing the needles while discharging fluid into the meat product.

2. The method of claim 1 wherein the period of time is as long as the duration of time that the needles are in the meat product.

3. The method of claim 1 wherein the needles have a roughened outside surface to facilitate the creation of the enlarged size of the penetration hole.

4. The method of claim 3 wherein the needles vibrate laterally with respect to a longitudinal axis of the needles.

5. The method of claim 1 further comprising vibrating the needles while they are outside the meat product.

* * * * *